(12) United States Patent
Cho et al.

(10) Patent No.: US 12,247,910 B2
(45) Date of Patent: Mar. 11, 2025

(54) HIGH RESOLUTION FLUORESCENCE IMAGING DEVICE AND METHOD FOR MANUFACTURING THE SAME

(71) Applicant: KOREA INSTITUTE OF SCIENCE AND TECHNOLOGY, Seoul (KR)

(72) Inventors: Il-Joo Cho, Seoul (KR); Nakwon Choi, Seoul (KR); Hyogeun Shin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 218 days.

(21) Appl. No.: 17/962,066

(22) Filed: Oct. 7, 2022

(65) Prior Publication Data
US 2023/0110294 A1  Apr. 13, 2023

(51) Int. Cl.
| | | |
|---|---|---|
| G01N 15/1434 | (2024.01) | |
| F21V 8/00 | (2006.01) | |
| G01N 15/14 | (2024.01) | |
| G02B 1/04 | (2006.01) | |

(52) U.S. Cl.
CPC ..... *G01N 15/1436* (2013.01); *G01N 15/1484* (2013.01); *G02B 1/045* (2013.01); *G02B 6/0068* (2013.01)

(58) Field of Classification Search
CPC .......................... G01N 21/6454; G01N 21/648
See application file for complete search history.

(56) References Cited

U.S. PATENT DOCUMENTS

| | | | |
|---|---|---|---|
| 8,033,706 B1 | 10/2011 | Kelly et al. | |
| 9,331,113 B2 | 5/2016 | Ozcan et al. | |
| 9,343,494 B2 | 5/2016 | Lee et al. | |
| 9,407,838 B2 | 8/2016 | Butte et al. | |
| 2010/0320363 A1* | 12/2010 | Schleipen | G01N 21/7703 250/200 |
| 2014/0049983 A1 | 2/2014 | Nichol et al. | |
| 2017/0227465 A1* | 8/2017 | Hsieh | G02B 6/0053 |
| 2020/0173920 A1* | 6/2020 | Oki | G01N 21/255 |
| 2022/0074859 A1* | 3/2022 | Sun | G01N 21/6428 |

FOREIGN PATENT DOCUMENTS

| | | |
|---|---|---|
| JP | 2005-514591 A | 5/2005 |
| JP | 2009-128012 A | 6/2009 |
| JP | 4436110 B2 | 3/2010 |
| JP | 5067413 B2 | 11/2012 |

(Continued)

*Primary Examiner* — Thanh Luu
(74) *Attorney, Agent, or Firm* — NSIP Law

(57) ABSTRACT

A high resolution fluorescence imaging device includes a light guide plate having a fluid channel which allows a solution containing a fluorescent sample to pass; a light source disposed on a side of the light guide plate to irradiate light inward the light guide plate; an image sensor disposed under the light guide plate; and a thin film interposed between the light guide plate and the image sensor, wherein the thin film has a first surface having a plurality of pillars and a second surface, the pillars separate the light guide plate and the image sensor apart from each other, and the second surface is bonded to the light guide plate. According to an embodiment, since the light guide plate acts in place of a filter element, it is possible to manufacture in ultrasmall size and achieve multiple fluorescence imaging without replacing a filter.

10 Claims, 7 Drawing Sheets

(56) References Cited

FOREIGN PATENT DOCUMENTS

| | | |
|---|---|---|
| JP | 2016-522448 A | 7/2016 |
| JP | 2017-138329 A | 8/2017 |
| KR | 10-2020-0011673 A | 2/2020 |
| KR | 10-2229731 B1 | 3/2021 |
| WO | WO 03/054527 A1 | 7/2003 |
| WO | WO 2014/195204 A1 | 12/2014 |

* cited by examiner

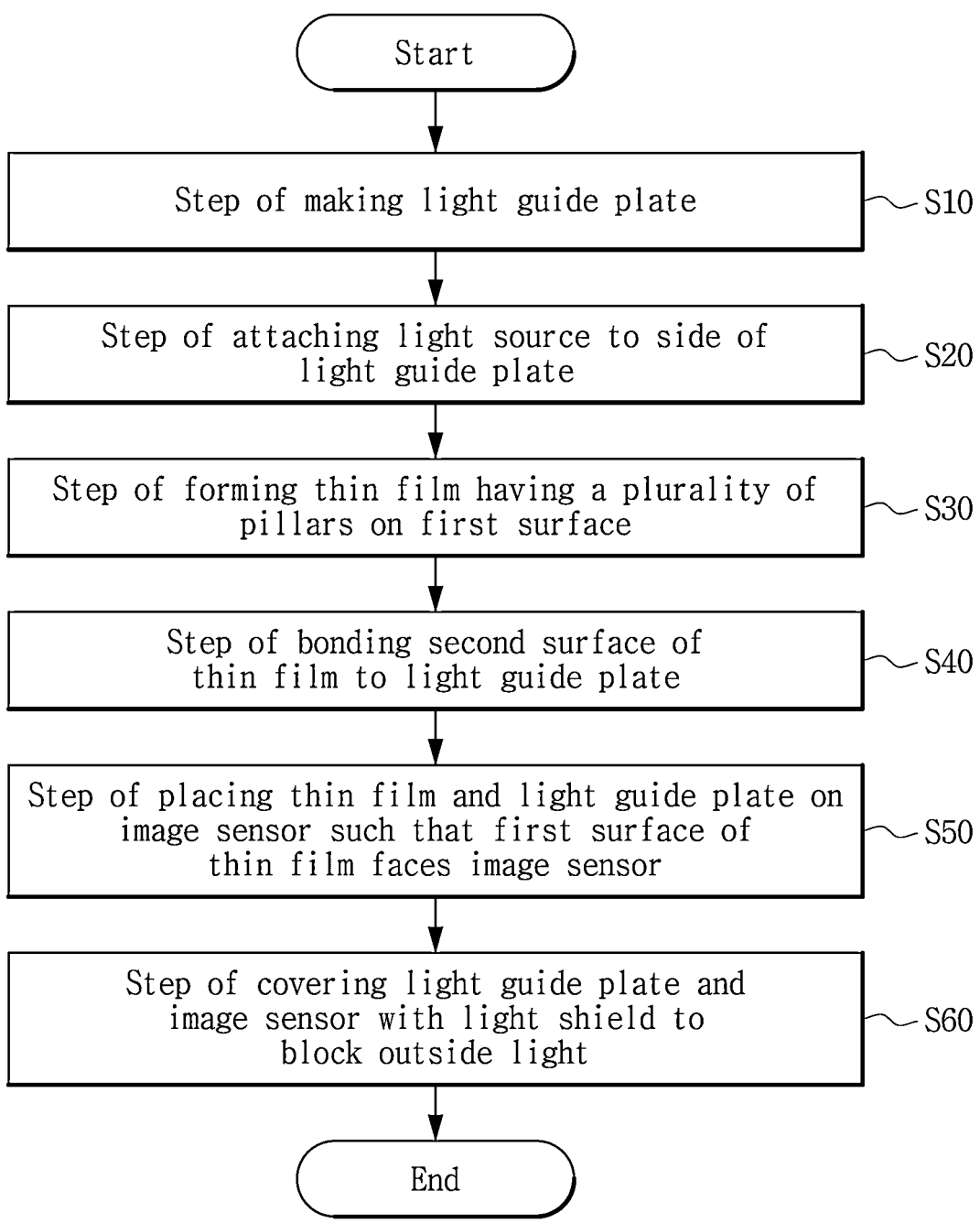

HIGH RESOLUTION FLUORESCENCE IMAGING DEVICE AND METHOD FOR MANUFACTURING THE SAME

DESCRIPTION OF GOVERNMENT-FUNDED RESEARCH AND DEVELOPMENT

This research is conducted under the support of Institute for Information & Communication Technology Planning & Evaluation (ICT promising high technology development promotion (R&D), Development of CMOS imaging fluorescence detection systems for simultaneous multiple rapid diagnosis of infectious respiratory RNA viruses, Project Serial number: 1711134734) of Ministry of Science and ICT.

CROSS-REFERENCE TO RELATED APPLICATION

This application claims priority to Korean Patent Application No. 10-2021-0134248, filed on Oct. 8, 2021, and all the benefits accruing therefrom under 35 U.S.C. § 119, the contents of which in its entirety are herein incorporated by reference.

BACKGROUND

1. Field

The present disclosure relates to a high resolution fluorescence imaging device and a method for manufacturing the same, and more particularly, to an imaging device capable of imaging a fluorescent sample with high resolution using a light guide plate having a pillared thin film without any filter or lens and a method for manufacturing the same.

2. Description of the Related Art

In physics, biology and chemistry, optical imaging technology is widely used to observe very small samples. In particular, compared to optical microscopes, fluorescence microscopes are commonly used to observe samples such as biochips for their ability to give clear images.

With the recent development of image sensor technology, compact fluorescence imaging systems capable of observing fluorescent samples have been introduced. The fluorescence imaging systems are designed to irradiate samples stained with fluorescent materials (fluorescent dyes) with excitation light of absorption wavelengths of the fluorescent materials and create images of the samples through emission light emitted from the samples to observe the samples, using the principle that fluorophores absorb light of specific wavelengths and emit fluorescence. In this instance, when the excitation light irradiated on the fluorescent materials is observed together with the emission light, it degrades the accuracy and reliability of the observation results, so it is necessary to remove it. To this end, the existing fluorescence imaging systems generally include filters to block the light of the specific wavelengths, and need light sources and lenses.

Accordingly, the existing fluorescence imaging systems are not suitable for multiple fluorescence imaging that requires simultaneous measurement of fluorescence signals of multiple wavelengths due to the need for filters to block the light of the specific wavelengths, and to enable multiple fluorescence imaging, their structure becomes complex and the size and weight are so large that they are not easy to carry. Additionally, due to their high costs, they are not suitable for use in a wide range of applications, and fluorescence imaging systems using lenses have a narrow field of view (FOV). Lensless fluorescence imaging systems have a relatively simple structure, are easy to carry and have a relatively wide FOV, but likewise, they are not suitable for multiple fluorescence imaging due to the need for filters to block the light of the specific wavelengths.

SUMMARY

The present disclosure is designed to solve the above-described problem, and therefore the present disclosure is directed to providing multiple fluorescence imaging technology capable of imaging a fluorescent sample with high resolution using a light guide plate having a pillared thin film without any filter or lens.

A high resolution fluorescence imaging device according to an embodiment includes a light guide plate having a fluid channel which allows a solution containing a fluorescent sample to pass; a light source disposed on a side of the light guide plate to irradiate light inward the light guide plate; an image sensor disposed under the light guide plate; and a thin film interposed between the light guide plate and the image sensor, wherein the thin film has a first surface having a plurality of pillars and a second surface, the pillars separate the light guide plate and the image sensor apart from each other, and the second surface is bonded to the light guide plate.

According to an embodiment, the light irradiated from the light source may excite the fluorescent sample in the solution passing through the fluid channel, and light emitted from the fluorescent sample may be transmitted to the image sensor through the thin film.

According to an embodiment, the light irradiated from the light source may be totally internally reflected in the light guide plate.

According to an embodiment, the light source includes a plurality of light source units, and the plurality of light source units irradiates the light of different excitation wavelengths.

According to an embodiment, a height of the pillars for separating the image sensor and the light guide plate apart from each other may be 2 μm or less.

According to an embodiment, the light guide plate and/or the thin film may be made of polydimethylsiloxane (PDMS).

According to an embodiment, the image sensor may be a charge coupled device (CCD) image sensor or a complementary metal oxide semiconductor (CMOS) image sensor.

According to an embodiment, the high resolution fluorescence imaging device may further include a light shield to block outside light.

A method for manufacturing a high resolution fluorescence imaging device according to an embodiment includes making a light guide plate; attaching a light source to a side of the light guide plate, wherein the light source irradiates light inward the light guide plate; forming a thin film having a plurality of pillars on a first surface; bonding a second surface of the thin film to the light guide plate; and placing the thin film and the light guide plate on an image sensor such that the first surface of the thin film faces the image sensor.

According to an embodiment, the step of forming the thin film may include mixing a PDMS with a curing agent at a ratio of 5:1; and heating a mixture of the PDMS and the curing agent at a temperature of 200° C. or above.

According to an embodiment, the method for manufacturing a high resolution fluorescence imaging device may further include covering the light guide plate and the image sensor with a light shield to block outside light.

The fluorescence imaging device according to an embodiment of the present disclosure includes the image sensor and the light guide plate separated apart from each other through the pillared thin film below the light guide plate to induce total internal reflection of excitation light in the light guide plate. The excitation light excites the fluorescent sample that does not leak out from the light guide plate or reach the image sensor and is flowing along the fluid channel, and light emitted from the fluorescent sample is detected by the image sensor under the light guide plate. According to this structure, it is possible to prevent the contact between the light guide plate and the image sensor while maintaining the minimum distance between the fluorescent sample and the image sensor, thereby acquiring a high resolution image. Additionally, since the light guide plate can act in place of a filter element, it is possible to manufacture in ultrasmall size and achieve multiple fluorescence imaging without replacing a filter. Further, since the fluorescent sample can be injected through the microfluidic channel in the light guide plate, it is possible to observe changes of the sample in real time simultaneously with the test.

The effects that can be obtained from the present disclosure are not limited to the above-mentioned effects, and other effects not mentioned herein will be clearly understood by those skilled in the art from the following description.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and are not intended to be limiting of the present disclosure. In addition, for clarity of description, the illustration of some elements in the drawings may be exaggerated or omitted.

FIG. 7 is a flowchart showing a method for manufacturing a high resolution fluorescence imaging device according to an embodiment.

DETAILED DESCRIPTION

Figure 1:
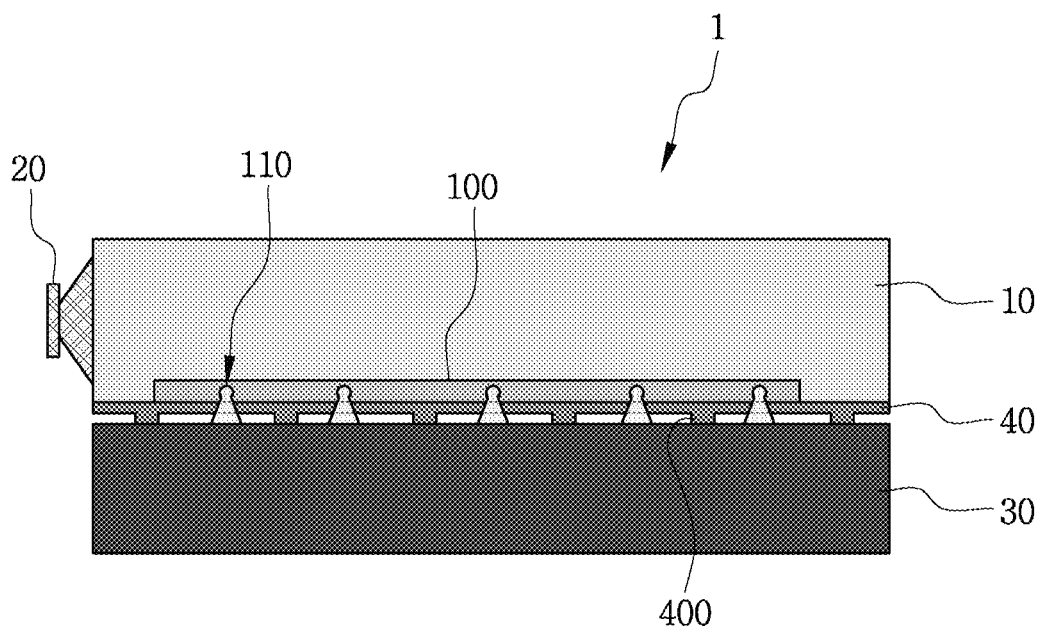
FIG. 1 is a cross-sectional view showing a fluorescence imaging device according to an embodiment.

The following detailed description of the present disclosure is made with reference to the accompanying drawings, in which particular embodiments for practicing the present disclosure are shown for illustrative purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs indicate same or similar functions in many aspects.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be interpreted based on the substantial meaning of the terms and the context throughout the specification, rather than simply the name of the terms.

Hereinafter, exemplary embodiments of the present disclosure will be described with reference to the accompanying drawings.

FIG. 1 is a cross-sectional view showing a fluorescence imaging device according to an embodiment. Referring to FIG. 1, the fluorescence imaging device 1 includes a light guide plate 10 to provide a travel path of light, a light source 20 disposed on the side of the light guide plate 10 to irradiate light inward the light guide plate 10, an image sensor 30 disposed under the light guide plate 10, and a thin film 40 interposed between the light guide plate 10 and the image sensor 30.

The light guide plate 10 is a plate that provides the path along which light travels from the light source 20 disposed on the side, and may have a very small thickness compared to the width of the plate. According to an embodiment, the light guide plate 10 may be larger in size than the image sensor 30 to block light directly irradiated from the light source 20 onto the image sensor 30 and light of any other angle than total internal reflection, thereby providing a sufficient distance between the light source and the image sensor. The light guide plate 10 may be made of an arbitrary material having a higher refractive index of light than air (n=1). For example, polydimethylsiloxane (PDMS) may be used.

The light source 20 is disposed on the side of the light guide plate 10 to irradiate light inward the light guide plate 10. For example, the light source may include various types of means for providing light of excitation wavelength, such as a diode, a laser or a light emitting diode (LED). The light guide plate 10 is made of a material having a higher refractive index of light than air, and total internal reflection occurs in the light guide plate 10.

According to an embodiment, the light source 20 may include a plurality of light source units to provide different excitation wavelengths, thereby achieving multiple fluorescence imaging. For example, the light source units may include green, blue and red LEDs to induce a specific fluorescent sample to emit light.

The light guide plate 10 has a fluid channel 100 along the lower surface of the light guide plate 10 therein. A solution containing the target fluorescent sample 110 for imaging is injected through the fluid channel 100. According to an embodiment, the fluid channel 100 may be formed in the lower surface of the light guide plate 10 in a zigzag pattern to maximize the imaging area.

Figure 2:
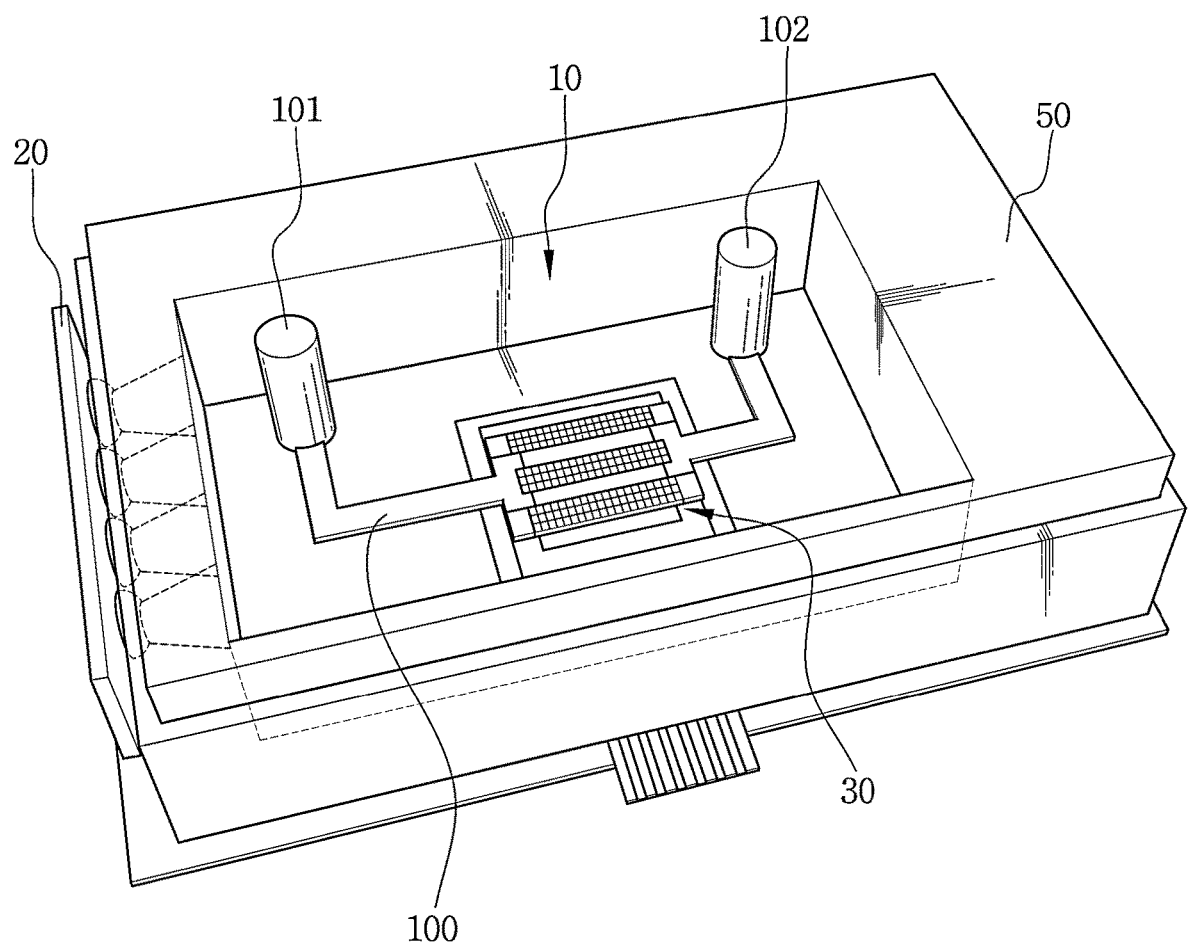
FIG. 2 is a perspective view showing a fluorescence imaging device according to an embodiment.

FIG. 2 is a perspective view showing the high resolution fluorescence imaging device according to an embodiment. Referring to FIG. 2, the light guide plate 10 has entry/exit ports 101, 102 connecting the outside of the light guide plate 10 to the fluid channel 100 to inject or extract the solution containing the fluorescent sample. For example, when the fluorescent sample solution is injected through the entry/exit port 101, the solution flows along the fluid channel 100 in the lower surface of the light guide plate 10, and in this instance, when the fluorescent sample excited by the light source emits light, the image sensor 30 under the lower surface of the light guide plate 10 detects the light to acquire an image of the fluorescent sample. The solution passing through the fluid channel 100 may be extracted out of the light guide plate 10 through the entry/exit port 102.

The image sensor 30 is the element that receives the light of emission wavelength generated from the fluorescent sample in the fluid channel 100 and converts it into digital image data. For example, the image sensor 30 may be a charge coupled device (CCD) or complementary metal oxide semiconductor (CMOS) image sensor. When the fluorescent sample solution passes through the fluid channel 100 in the lower surface of the light guide plate 10, the image sensor 30 under the lower surface of the light guide plate 10 receives the light of emission wavelength generated from the fluorescent sample 110. In this instance, there is no need for a lens between the lower surface of the light guide plate 10 and the image sensor 30. In case that a lens is used, as the magnification becomes higher to observe the sample, the field of view (FOV) becomes narrower, but in the case of the present disclosure using the image sensor 30 without a lens, the size of the image sensor 30 corresponds to the FOV, thereby providing a generally wider FOV than the lens.

According to an embodiment, to prevent the transmission of light directly irradiated from the light source of the light guide plate 10 onto the image sensor 30 and light of any other angle than total internal reflection to the image sensor 30, the image sensor 30 may be manufactured with a smaller area than the light guide plate 10.

Referring back to FIG. 1, the thin film 40 is interposed between the light guide plate 10 and the image sensor 30. The thin film 40 has, on a first surface, a plurality of pillars 400 to separate the light guide plate 10 and the image sensor 30 apart from each other, and a second surface opposite the first surface is bonded to the bottom of the light guide plate 10. According to an embodiment, the thin film 40 and the pillars 400 may be made of an arbitrary material having a higher refractive index of light than air (n=1) and a lower refractive index than the light guide plate 10. For example, in the same way as the light guide plate 10, the thin film 40 may be made of PDMS, but the mixing ratio is adjusted such that the thin film 40 has a lower refractive index than the light guide plate 10.

The plurality of pillars 400 on one surface of the thin film 40 is the element for separating the light guide plate 10 and the thin film 40 apart from the image sensor 30 by a predetermined distance, and the height of each pillar may be 2 μm or less, but is not limited thereto, and the pillars may be so high as to prevent the contact between the thin film and the image sensor depending on the material and strength of the thin film.

Referring to FIG. 2, the fluorescence imaging device according to an embodiment may further include a light shield 50 to block outside light. The light shield 50 is a black covering that covers the light guide plate 10 and the image sensor 30, and blocks out light from the outside to prevent the light from reaching the light guide plate 10 or the image sensor 30.

The light irradiated from the light source 20 is totally internally reflected in the light guide plate 10 and excites the fluorescent sample 110 and light emitted from the sample is transmitted to the image sensor 30. In this instance, when the distance between the fluorescent sample 110 and the image sensor 30 is large, the resolution reduces (i.e., the minimum distance for distinguishing independent individual fluorescent samples increases) due to the spreading of light. On the contrary, as the distance between the fluorescent sample 110 and the image sensor 30 is smaller, the resolution increases, and when the distance between the light guide plate 10 and the image sensor 30 is too small or the light guide plate 10 and the image sensor 30 come into contact with each other, total internal reflection of light in the light guide plate 10 does not occur, resulting in failed imaging.

The present disclosure bonds, to the lower surface of the light guide plate 10, the thin film 40 having the plurality of pillars 400 to separate the light guide plate 10 and the image sensor 30 apart from each other while supporting the light guide plate 10 to maintain the minimum distance between the light guide plate 10 and the image sensor 30. As described above, since the thin film 40 is made of a material having the refractive index that is higher than air and lower than the light guide plate 10, the output light from the light source 20 is totally internally reflected in the light guide plate 10 and the thin film 40.

Figure 3:
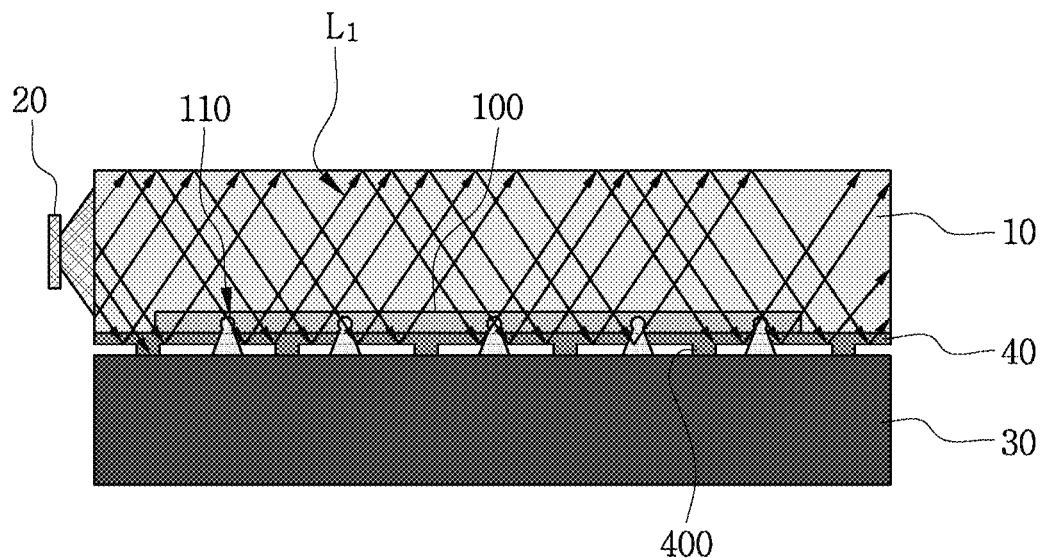
FIG. 3 shows a path along which excitation light travels in a light guide plate of a fluorescence imaging device according to an embodiment.

FIG. 3 shows the path along which excitation light travels in the light guide plate of the high resolution fluorescence imaging device according to an embodiment. Referring to FIG. 3, light $L_1$ of excitation wavelength travels along the path from the light source 20 disposed on the side of the light guide plate 10. When the light of excitation wavelength reaches the lower surface of the light guide plate 10, the light is totally internally reflected in the thin film 40 at its interface with air, and is not transmitted to the image sensor 30. In contrast, when the light of excitation wavelength is transmitted to the solution flowing along the fluid channel 100, the fluorescent sample 110 emits light by the excitation light. The light emitted from the fluorescent sample 110 is transmitted to the image sensor 30 through the thin film 40. As described above, the light guide plate 10 itself acts in place of a filter to minimize the transmission of the light of excitation wavelength to the image sensor 30, thereby achieving simultaneous imaging of multiple wavelengths emitted from multiple fluorescent samples without a filter.

Figure 4:
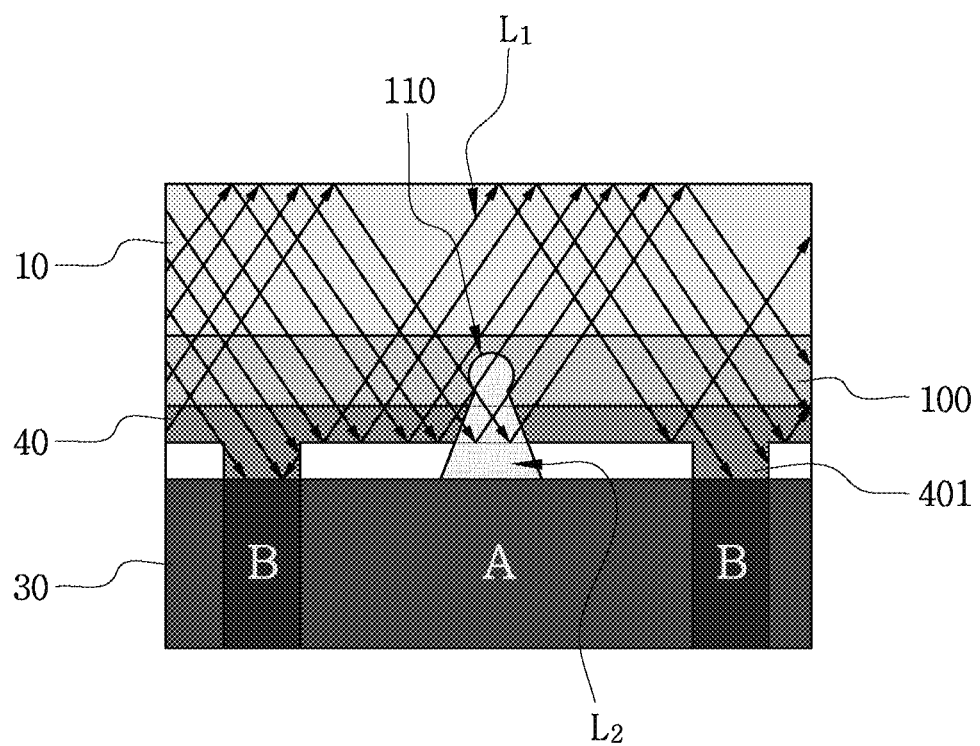
FIG. 4 is a diagram illustrating an operating principle of a fluorescence imaging device according to an embodiment.

FIG. 4 is a diagram illustrating the operating principle of the high resolution fluorescence imaging device according to an embodiment. Referring to FIG. 4, the output light $L_1$ of excitation wavelength traveling inward from the light source on the side of the light guide plate 10 is totally internally reflected when it reaches the upper surface of the light guide plate 10, and when it reaches the lower surface, is totally internally reflected in the thin film 40 at its interface with air and travels to the right. When the light $L_1$ of excitation wavelength travels and reaches the fluorescent sample 110 in the fluid channel 100, the fluorescent sample 110 is excited and emits light $L_2$ of a specific wavelength. The light $L_2$ emitted from the fluorescent sample 110 reaches the image sensor 30 through the thin film 40. In this instance, in the area of the image sensor 30, at a region A where the thin film pillars 401 are absent on the sensor, i.e., a region where the light guide plate 10 and the image sensor 30 are separated apart from each other and total internal reflection occurs by an air gap, the fluorescent sample 110 can be observed, and at a region B where the thin film pillars 401 are present immediately on the sensor, i.e., a region where the image sensor 30 and the thin film 40 come into contact with each other and total internal reflection does not occur, the fluorescent sample 110 is not observed.

As described above, according to the fluorescence imaging device of the present disclosure, it is possible to achieve imaging of the fluorescent sample using the total internal reflection principle of the light guide plate without any filter. However, when the light guide plate and the image sensor come into contact with each other for any reason, total internal reflection does not occur, resulting in failed high resolution imaging. In this context, the present disclosure designs the light guide plate having the pillared thin film to separate the light guide plate and the image sensor apart from each other and allow excitation wavelength light of the light source to be totally internally reflected in the light guide plate, thereby achieving high resolution imaging of the fluorescent sample.

Figure 5A:
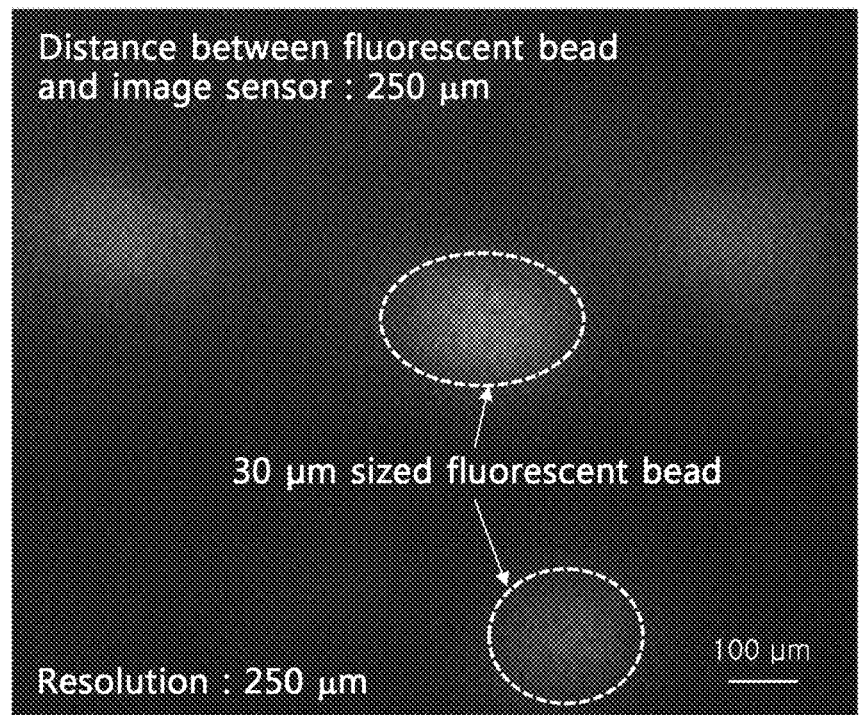
FIG. 5A shows a result of imaging a fluorescent sample by a device without a pillared thin film that separates an image sensor and a light guide plate apart from each other.
Figure 5B:
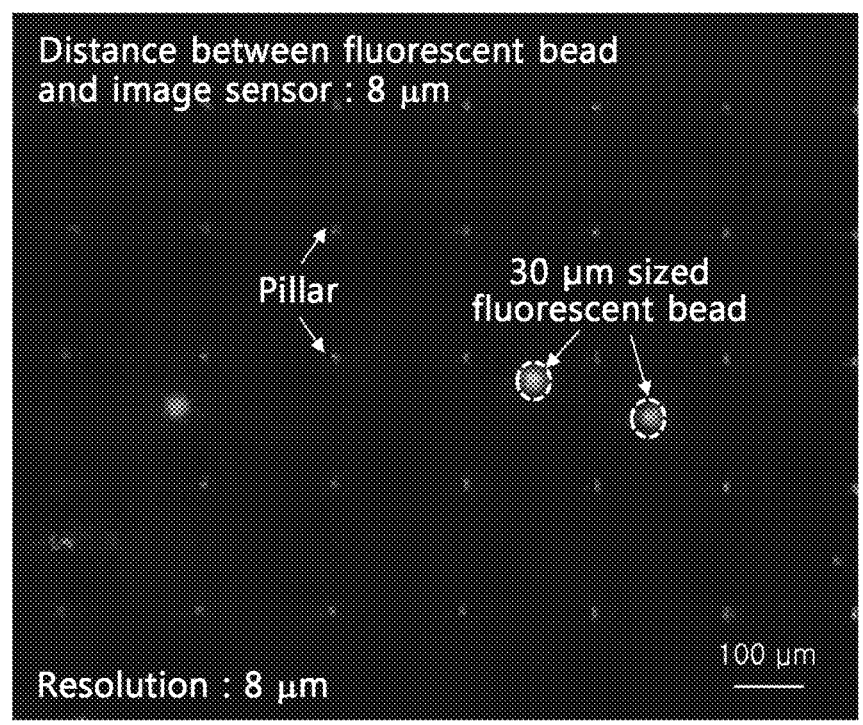
FIG. 5B shows a result of imaging a fluorescent sample by a device with a pillared thin film that separates an image sensor and a light guide plate apart from each other.

FIG. 5A shows a result of imaging the fluorescent sample in the absence of the pillared thin film that separates the image sensor and the light guide plate apart from each other, and FIG. 5B shows a result of imaging the fluorescent sample in the presence of the pillared thin film that separates the image sensor and the light guide plate apart from each other.

In FIG. 5A, when the distance between the fluorescent sample and the image sensor is set to 250 μm, and there is no pillared thin film that separates the image sensor and the light guide plate apart from each other, the light guide plate and the image sensor come into contact with each other and total internal reflection does not occur. In this case, the resolution reduces as shown.

In contrast, in FIG. 5B, the distance between the fluorescent sample and the image sensor is set to 8 μm, and the light guide plate and the image sensor are separated apart from each other using the pillared thin film, and as a result, total internal reflection occurs in the light guide plate. In this case, the resolution increases as shown.

Figure 6A:
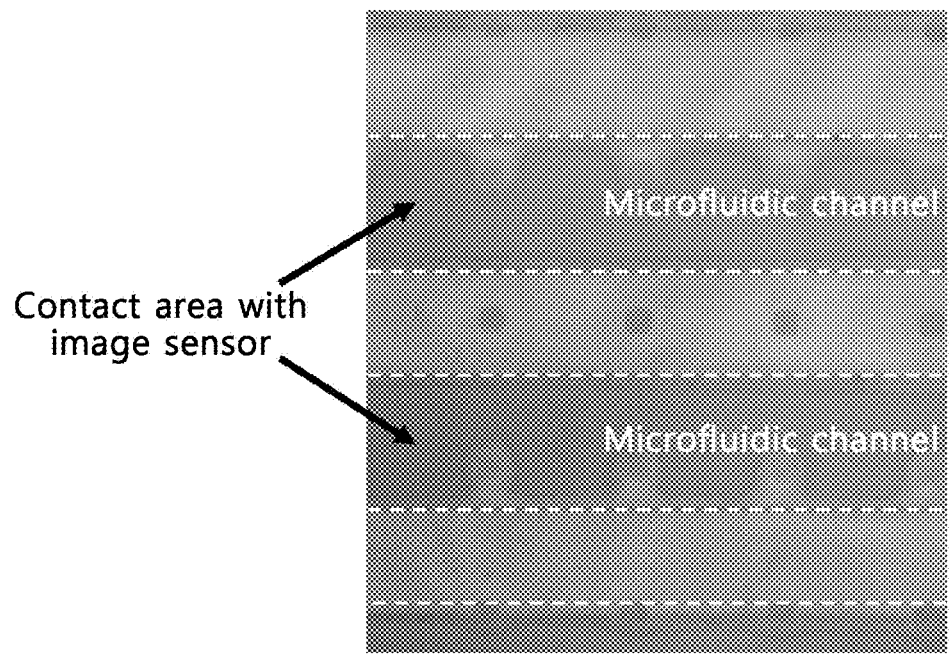
FIGS. 6A to 6C show imaging results as a function of a polydimethylsiloxane (PDMS) mixing ratio of a pillared thin film.
Figure 6B:
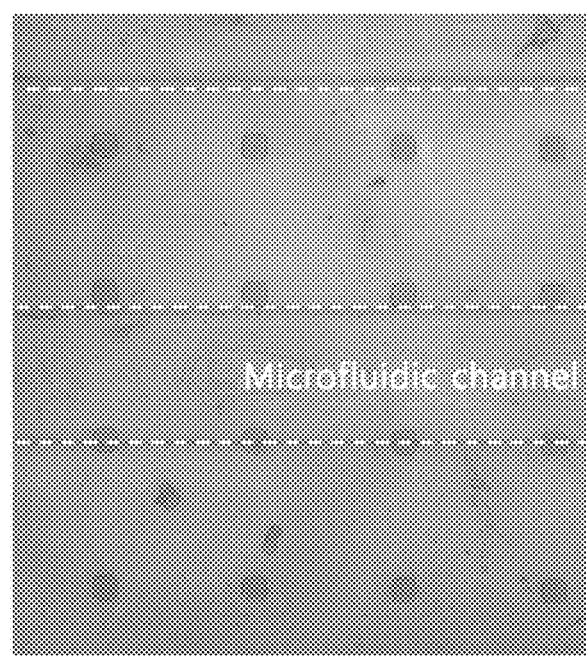
Figure 6C:
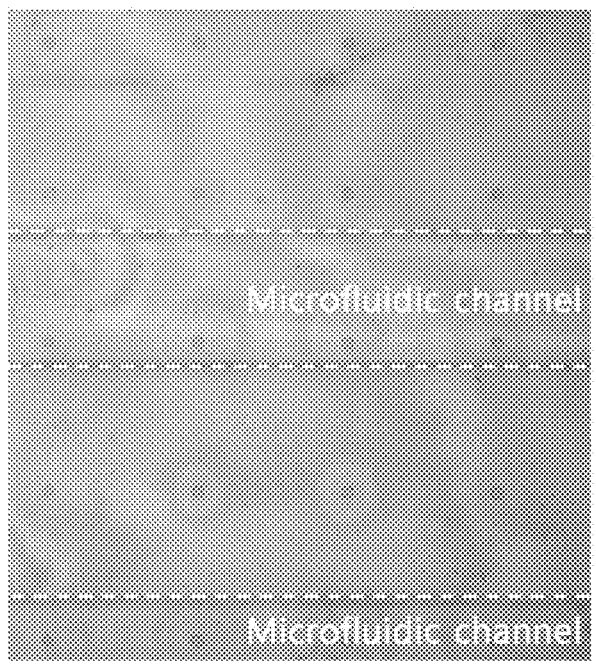

FIGS. 6A to 6C show the imaging results as a function of the PDMS mixing ratio of the pillared thin film. The pillared thin film is the element that separates the light guide plate apart from the image sensor while supporting the light guide plate, and when the strength of the thin film is not enough high, it fails to maintain the distance between the light guide plate and the image sensor, so the lower surface of the thin film contacts the image sensor, and total internal reflection in the light guide plate does not occur. Accordingly, it is important to form the pillared thin film having the strength that is sufficiently high to prevent the contact between the image sensor and the thin film due to the weight of the light guide plate and the integrated components on the light guide plate.

FIG. 6A shows a result of applying the pillared thin film formed by mixing the PDMS with the curing agent at the ratio of 10:1 and curing at the temperature of 80° C. or less. In the experimental example, the diameter of each pillar is set to 30 μm, and the distance between neighboring pillars is set to 200 μm. As shown, in this case, the lower surface of the thin film contacts the image sensor due to the insufficient strength of the pillared thin film, failing to obtain a desirable result.

FIG. 6B shows a result of applying the pillared thin film formed by mixing the PDMS with the curing agent at the ratio of 5:1 and curing at the temperature of 200° C. or above. In the experimental example, in the same way as FIG. 5A, the diameter of each pillar is set to 30 μm and the distance between neighboring pillars is set to 200 μm. As shown, in this case, the lower surface of the thin film is separated apart from the image sensor due to the sufficient strength of the pillared thin film, yielding a desirable result.

FIG. 6C shows a result of applying the pillared thin film formed by mixing the PDMS with the curing agent at the ratio of 5:1 and curing at the temperature of 200° C. or above. In the experimental example, the diameter of each pillar is set to 10 μm, and the distance between neighboring pillars is set to 200 μm. In this case, a filling ratio of the pillars (a ratio of the area occupied by the pillars to the total area of the thin film) is set to be lower than FIG. 5B, but the lower surface of the thin film is separated apart from the image sensor due to the sufficient strength of the pillared thin film, yielding a desirable result.

As described above, since the light guide plate has the pillared thin film with sufficient strength on the lower surface thereof, it is possible to maintain the distance between the light guide plate and the image sensor to induce total internal reflection in the light guide plate and minimize the filling ratio, thereby increasing the observation range of the fluorescent sample.

In this instance, the distance between the thin film and the image sensor by the pillars may be so large that total internal reflection occurs by the difference in refractive index between air and the thin film, but the thin film and the image sensor may be separated apart from each other by the minimum distance, considering the resolution of images acquired by the image sensor. For example, the height of the pillars (i.e., the distance between the thin film and the image sensor) may be 2 μm or less, but is not limited thereto, and the pillars may have the optimal height depending on the strength and elastic coefficient of the thin film.

FIG. 7 is a flowchart showing a method for manufacturing a high resolution fluorescence imaging device according to an embodiment.

Referring to FIG. 7, first, the step (S10) of making the light guide plate is performed. The light guide plate is a plate that provides the path along which light travels from the light source disposed on the side, and has a very small thickness (for example, about 100 μm) compared to the width of the plate. According to an embodiment, the light guide plate may be made of an arbitrary material (for example, PDMS) having a higher refractive index of light than air (n=1) to induce total internal reflection of light incident from the light source. The light guide plate has the fluid channel along the lower surface therein. The fluid channel allows the solution containing the target fluorescent sample for imaging to pass therethrough.

Subsequently, the step (S20) of attaching, to the side of the light guide plate, the light source that irradiates light inward the light guide plate is performed. The light source is the means for providing light of excitation wavelength, such as a diode, a laser or a light emitting diode (LED), and according to an embodiment, the light source may include the plurality of light source units to provide different excitation wavelengths.

Subsequently, the step (S30) of forming the thin film is performed. The thin film has, on the first surface, the plurality of pillars to separate the light guide plate and the image sensor apart from each other, and the second surface opposite the first surface is flat. The thin film and the pillars may be made of an arbitrary material having a higher refractive index of light than air (n=1) and a lower refractive index than the light guide plate. For example, in the same way as the light guide plate, the thin film may be made of PDMS, but the mixing ratio is adjusted such that the thin film has a lower refractive index than the light guide plate. The plurality of pillars on the first surface of the thin film is the element for separating the light guide plate and the thin film apart from the image sensor, and the height of each pillar may be 2 μm or less, but is not limited thereto, and the pillars may be so high as to prevent the contact between the thin film and the image sensor depending on the material and strength of the thin film.

According to an embodiment, the step (S30) of forming the thin film may include the step of mixing the PDMS with the curing agent at the ratio of 5:1 and the step of heating the mixture of the PDMS and the curing agent at the temperature of 200° C. or above. As described with reference to FIGS. 6A to 6C, in case that the strength of the thin film is too low, the thin film contacts the image sensor due to the weight of the light guide plate, and in this case, total internal reflection does not occur, failing to achieve fluorescence imaging. Accordingly, the high strength thin film may be formed through the above-described step to induce total internal reflection in the light guide plate to achieve high resolution imaging.

Subsequently, the step (S40) of bonding the second surface of the thin film to the light guide plate is performed. The flat second surface of the thin film is bonded to the lower surface of the light guide plate, i.e., the surface that faces the image sensor.

Subsequently, the step (S50) of placing the thin film and the light guide plate on the image sensor such that the first surface of the thin film having the plurality of pillars faces the image sensor is performed. The plurality of pillars on the first surface supports the thin film and the light guide plate while in contact with the image sensor, and separates the thin film apart from the image sensor to prevent the contact between them and induce total internal reflection in the light guide plate and the thin film. The fluorescent sample emits light through the total internal reflection of excitation light, and the image sensor detects the light emitted from the fluorescent sample as described above, and the description of the operating principle is omitted.

According to an embodiment, the method for manufacturing a fluorescence imaging device may further include the step (S60) of covering the light guide plate and the image sensor with the light shield to block outside light. The light shield is a black covering for blocking out light from the outside to prevent the light from reaching the light guide plate or the image sensor.

The high resolution fluorescence imaging device described above includes the light guide plate that acts in place of a filter element, and thus it is possible to manufacture in ultrasmall size and achieve multiple fluorescence imaging without replacing a filter. Additionally, since a lens is not used, it is possible to provide a wide FOV, and with the pillared thin film below the light guide plate, it is possible to maintain the minimum distance between the image sensor and the fluorescent sample, thereby acquiring a high resolution image. Further, since the fluorescent sample can be injected through the microfluidic channel in the light guide plate, it is possible to observe changes of the sample in real time simultaneously with the test.

In the specific embodiments described above, the elements in the present disclosure are represented in a singular or plural form according to the specific embodiments presented therein. However, the singular or plural form is selected suitably for the presented situation for convenience of description, and the above-described embodiments are not limited to a single element or a plurality of elements, and even elements represented in a plural form may be a single element, and even elements represented in a singular form may be a plurality of elements.

Although the specific embodiments of the present disclosure have been described, many modifications may be made thereto without departing from the technical spirit and scope included in various embodiments. Therefore, the scope of the present disclosure should not be limited to the disclosed embodiment and should be defined by the appended claims and their equivalents.

What is claimed is:
1. A high resolution fluorescence imaging device, comprising:
 a light guide plate having a fluid channel which allows a solution containing a fluorescent sample to pass;
 a light source disposed on a side of the light guide plate to irradiate light inward the light guide plate;
 an image sensor disposed under the light guide plate; and
 a thin film interposed between the light guide plate and the image sensor, wherein the thin film has a first surface having a plurality of pillars and a second surface, the pillars separate the light guide plate and the image sensor apart from each other, and the second surface is bonded to the light guide plate,
 wherein the thin film and the plurality of pillars are made of a material having a refractive index that is higher than a refractive index of air and lower than a refractive index of the light quide plate, and an output light from the light source is totally internally reflected in the light guide plate and the thin film.
2. The high resolution fluorescence imaging device according to claim 1, wherein the light irradiated from the light source excites the fluorescent sample in the solution passing through the fluid channel, and
 light emitted from the fluorescent sample is transmitted to the image sensor through the thin film.
3. The high resolution fluorescence imaging device according to claim 1, wherein the light source includes a plurality of light source units, and the plurality of light source units irradiates the light of different excitation wavelengths.
4. The high resolution fluorescence imaging device according to claim 1, wherein a height of the pillars for separating the image sensor and the light guide plate apart from each other is 2 μm or less.
5. The high resolution fluorescence imaging device according to claim 1, wherein the light guide plate and the thin film are made of polydimethylsiloxane (PDMS).
6. The high resolution fluorescence imaging device according to claim 1, wherein the image sensor is a charge coupled device (CCD) image sensor or a complementary metal oxide semiconductor (CMOS) image sensor.
7. The high resolution fluorescence imaging device according to claim 1, further comprising:
 a light shield to block outside light.
8. A method for manufacturing a high resolution fluorescence imaging device, comprising:
 making a light guide plate;

attaching a light source to a side of the light guide plate, wherein the light source irradiates light inward the light guide plate;

forming a thin film having a plurality of pillars on a first surface;

bonding a second surface of the thin film to the light guide plate; and placing the thin film and the light guide plate on an image sensor such that the first surface of the thin film faces the image sensor, wherein the thin film and the plurality of pillars are made of a material having a refractive index that is higher than a refractive index of air and lower than a refractive index of the light guide plate, and an output light from the light source is totally internally reflected in the light guide plate and the thin film.

9. The method for manufacturing a high resolution fluorescence imaging device according to claim 8, wherein the step of forming the thin film comprises:

mixing a polydimethylsiloxane (PDMS) with a curing agent at a ratio of 5:1; and heating a mixture of the PDMS and the curing agent at a temperature of 200° C. or above.

10. The method for manufacturing a high resolution fluorescence imaging device according to claim 8, further comprising:

covering the light guide plate and the image sensor with a light shield to block outside light.

* * * * *

UNITED STATES PATENT AND TRADEMARK OFFICE
CERTIFICATE OF CORRECTION

| | | |
|---|---|---|
| PATENT NO. | : 12,247,910 B2 | Page 1 of 1 |
| APPLICATION NO. | : 17/962066 | |
| DATED | : March 11, 2025 | |
| INVENTOR(S) | : Il-Joo Cho et al. | |

It is certified that error appears in the above-identified patent and that said Letters Patent is hereby corrected as shown below:

On the Title Page

Between items (65) and (51) insert the following item (30):
--(30) Foreign Application Priority Data
Oct. 08, 2021 (KR) .................. 10-2021-0134248--

Signed and Sealed this
Fifteenth Day of April, 2025

Coke Morgan Stewart
*Acting Director of the United States Patent and Trademark Office*